United States Patent Office 3,006,848
Patented Oct. 31, 1961

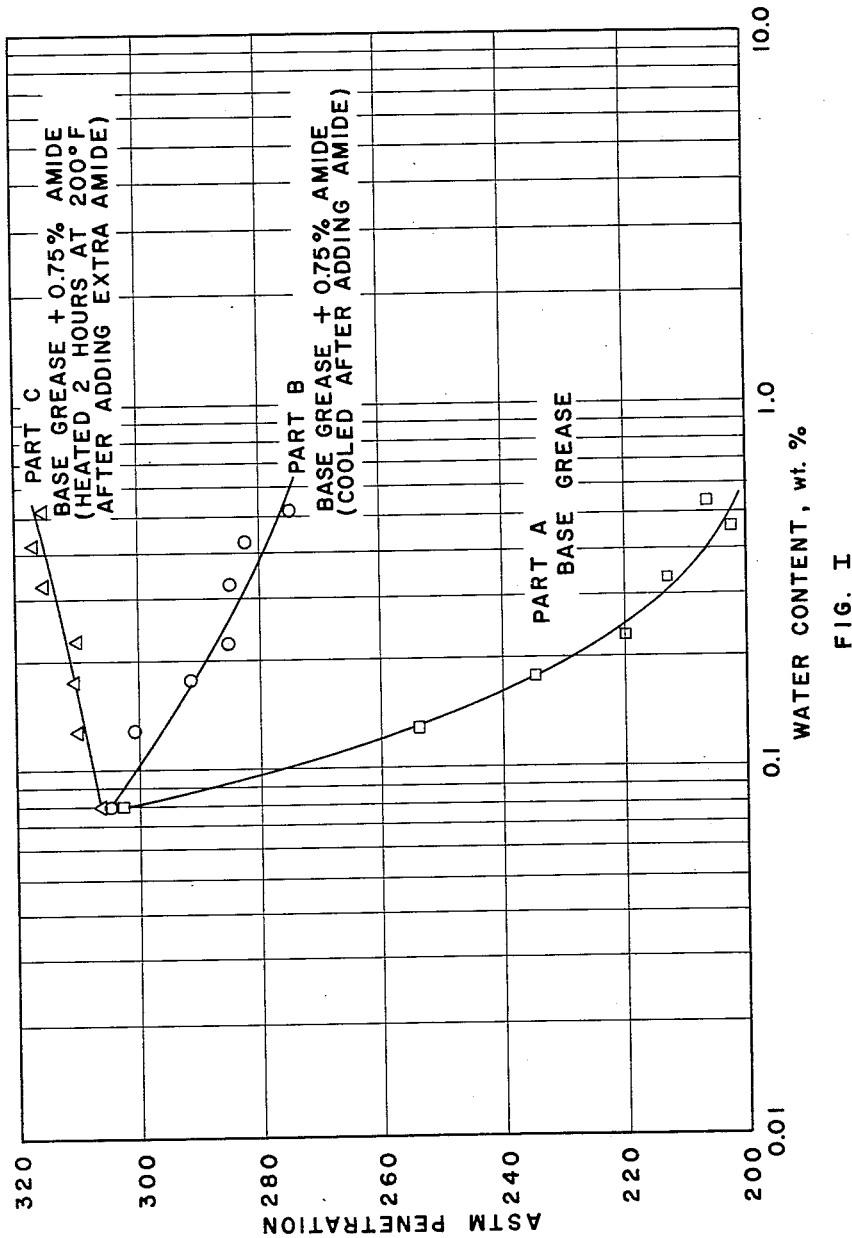
FIG. I

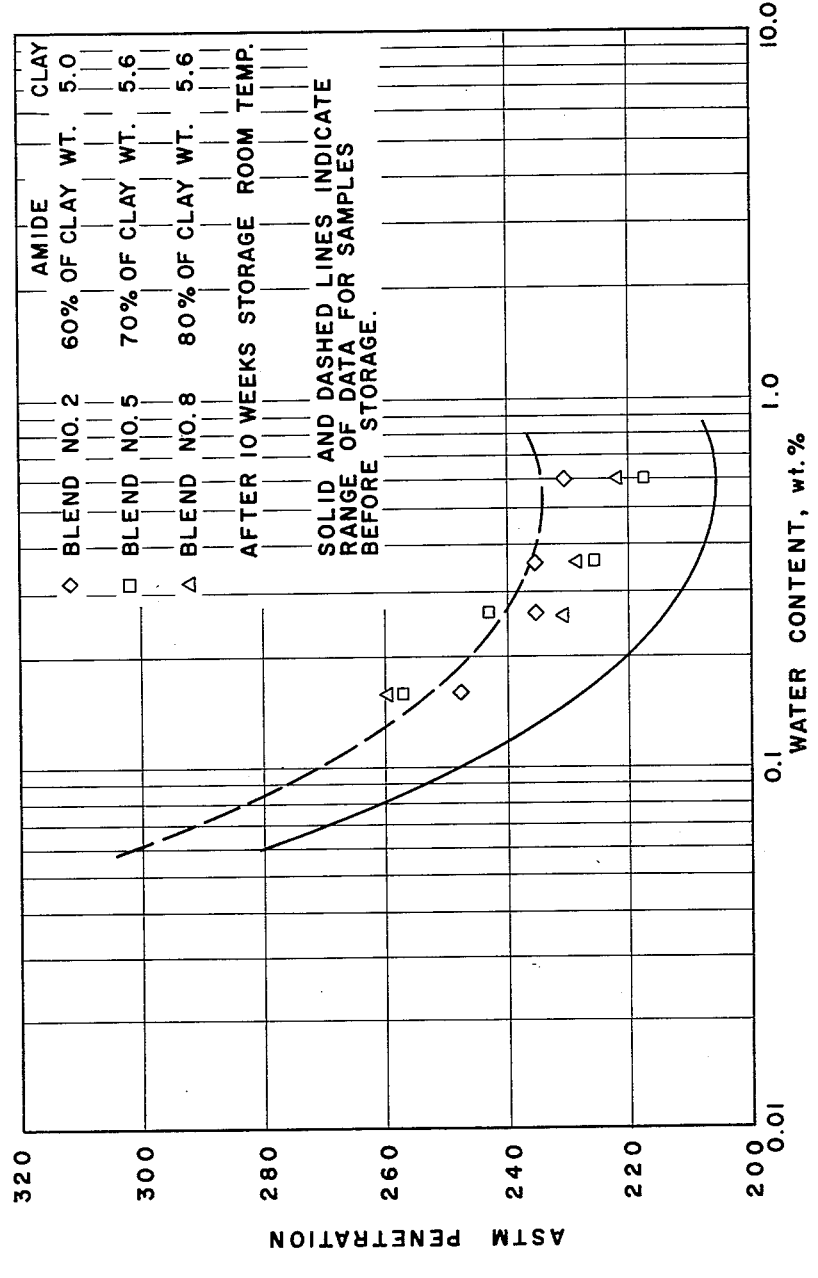
FIG. II

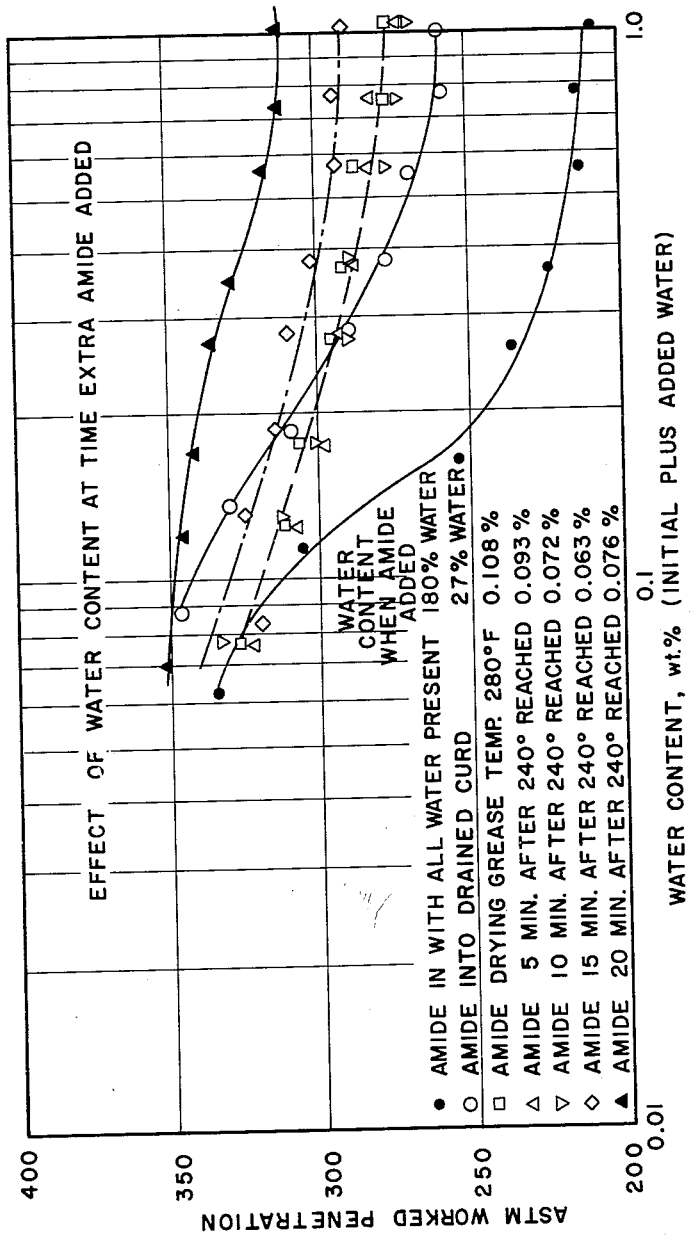

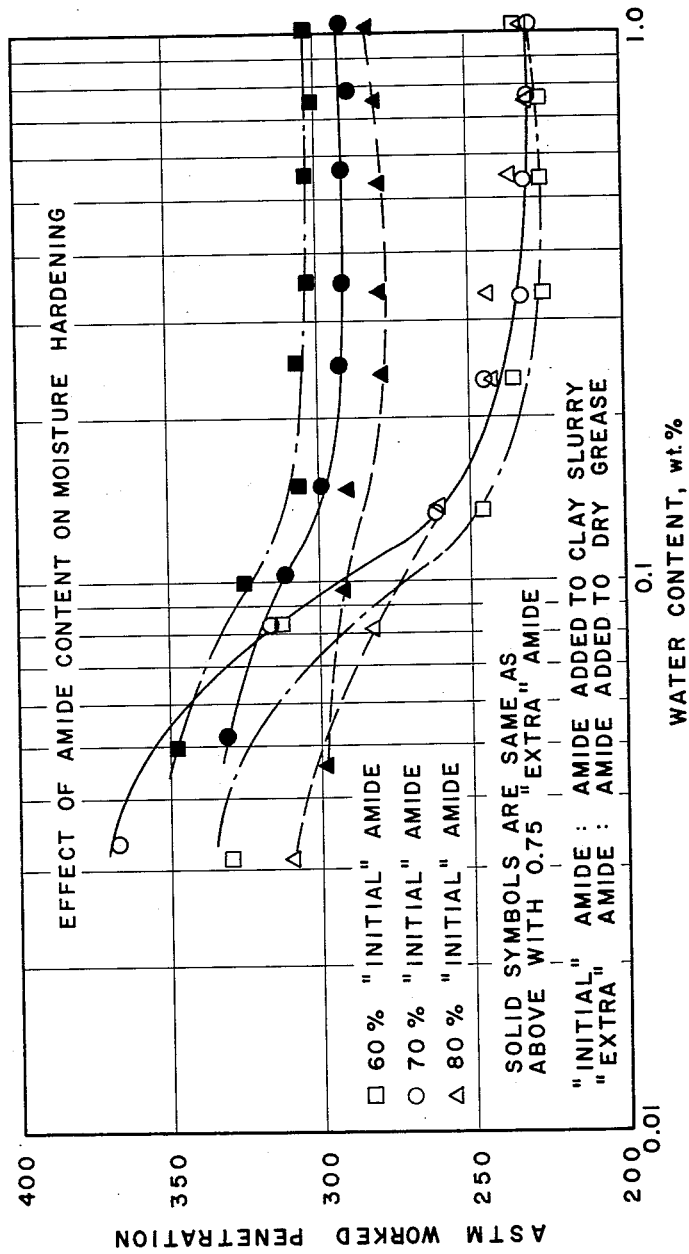
FIG. IV

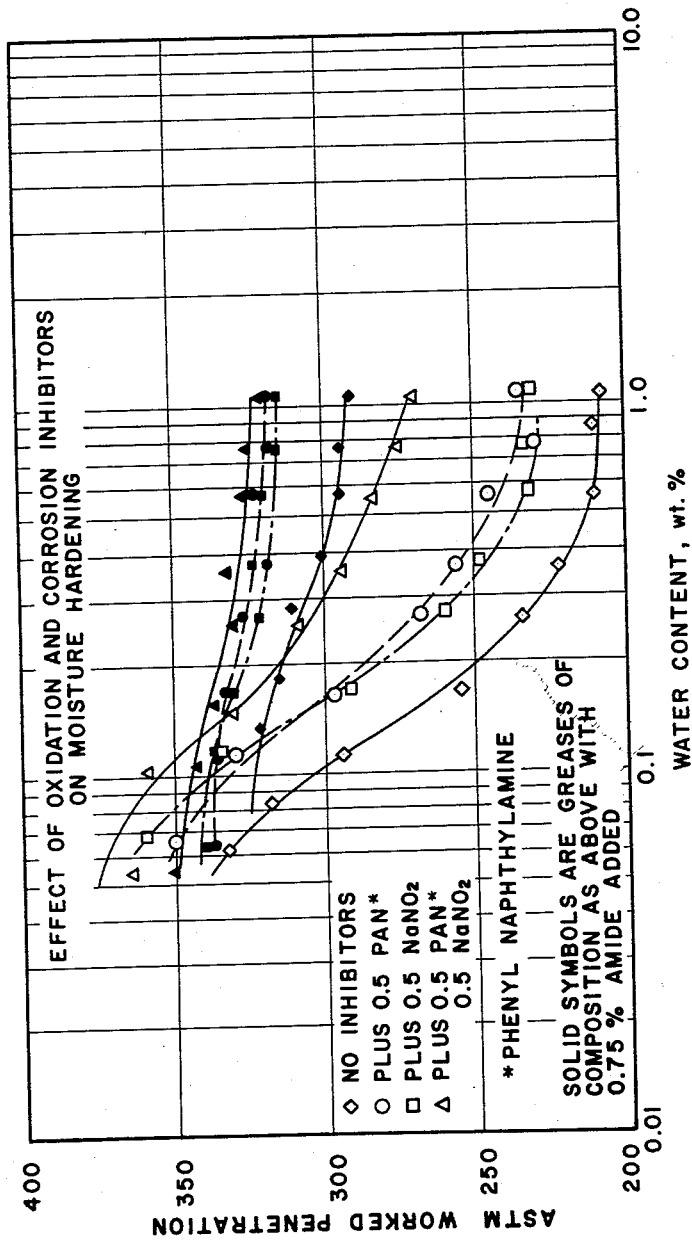

3,006,848
CLAY GREASE MANUFACTURING PROCESS
Gerard P. Caruso, New Orleans, La., assignor to Shell Oil Company, a corporation of Delaware
Filed Feb. 18, 1960, Ser. No. 9,655
14 Claims. (Cl. 252—28)

This invention is concerned with the production of clay greases. More particularly, it is concerned with the production of greases showing minimized change in consistency due to water absorption.

Within recent years greases have been developed comprising oleophilic clays as gelling agents in a lubricating oil base. The clays may be made oleophilic (hydrophobic) either by reaction of an onium compound with exchange sites of a clay to form an onium clay or by absorption of hydrophobic surfactants such as amino compounds on the surfaces of the clay gel. Such greases as these have a number of advantages over the traditional soap gel greases especially with regard to their lack of melting point and lack of phase transitions, such as soap base greases are subject to.

The presence of the hydrophobing agent is essential to the production of a successful clay base grease whenever it is expected that water will come in contact therewith. In the absence of a hydrophobing agent, a clay grease collapses and disintegrates upon contact with water. The presence of the hydrophobing agent also performs an additional function. Clay based greases are preferably prepared by dispersing the clay in water so as to obtain the most highly expanded form. The problem then is to transfer this clay from the water in which it is dispersed as a very dilute hydrogel into an oil without an expensive intermediate drying step during which care would have to be taken that the expanded structure is retained even during and after removal of water.

This transfer has been achieved by the vigorous mixing of a clay hydrogel with a water-immiscible oil such as mineral lubricating oil in the presence of a hydrophobic amine in an amount sufficient to cause reaction with or absorption upon the surface of the clay by the amino compound, thus converting the clay to one having an oleophilic hydrophobic surface, which thereupon is rapidly transferred from the water phase into the oil phase. Under the preferred set of conditions the large bulk of the water thereupon separates into one phase while a "curd" is formed consisting of the oleophilic clay, the oil and a minor amount of water. The curd is readily separated by filtration or centrifuging or the like from the large volume of water and the curd is then subjected to dehydration conditions such as by heating in a kettel above the boiling point of the water. The latter step may be done either at atmospheric pressure or under reduced pressure. It is preferred that the dehydrated product be subjected to milling, ordinarily in the order of at least 500 pounds per square inch in order to homogenize the grease and improve its structure as well as to increase the "yield" of the grease.

The greases produced by this preferred process have excellent properties insofar as their lubrication, corrosion, oxidation stability and other generally recognized grease properties.

Greases are made in a range of consistencies, the consistency being expressed in terms of "penetration," by myich is meant the distance into the grease to which a standard cone will penetrate under prescribed conditions. The consistency of the grease is varied fir optimum performance dependent upon the conditions under which it will be used. The sonsistency of the grease also affects the dispensibility of the grease, by which is meant the ease with which the grease can be forced from a container by means of the standard dispensing mechanisms to be found, for example, in service stations and the like.

It has been found that greases of the character described above tend to harden, especially on the portions nearest the surface of a container, during storage particularly in atmospheres containing moisture or water vapor. This hardening effect can be of substantial disadvantage to customers requiring a grease of a given consistency since by the time they are ready to utilize a grease bought and stored for a considerable period the consistency is no longer that of the grease when purchased.

It is an object of the present invention to improve the process for the preparation of grease compositions. It is another object of this invention to improve the process for the preparation of hydrophobe clay greases. It is a further object of the present invention to minimize the hardening of grease compositions. Other objects will become apparent during the following description of the present invention.

Now, in accordance with the present invention, it has been found that the hardening of greases gelled with organophilic clays as described above can be substantially minimized by the addition of 0.25–1% weight based on the grease of an amido amine formed by the reaction of between 0.3 and 0.6 equivalents of fatty acids having 10–22 carbon atoms per molecule and a mixture of one equivalent of polyethylene polyamines, 20–80% by weight of the mixture comprising polyamines having 2–3 nitrogen atoms per molecule, the remaining fraction being polyethylene polyamines having an average molecular weight within the range of 200–500. It is essential that this oil dispersible amido amine be added to the grease composition when it contains no more than about 5% by weight of water. Preferably, the amount of water present in the grease when the oil-dispersible amido amine is added to the grease is no more than about 0.5% by weight thereof.

The hydrophobic oleophilic clays are those bearing surface coatings (either reacted with or absorbed upon the clay) of hydrophobic amido amines which may be substantially identical with the oil-dispersible amido amnes just described or may be amidi amines which are polyamino oxy compounds containing an average of at least 3 amino nitrogen and oxy groups together per molecule as more fully described hereinafter.

Still further improvement in the resistance against hardening may be achieved by following the addition of the oil-dispersible amido amine with a heat treating period which is preferably between about 0.5 hours and 8 hours at a temperature between about 125 and 210° F. Under these conditions the maximum resistance to hardening can be achieved.

The hardening effect referred to above appears to be due to absorption of water from the atmosphere or elsewhere, since it has been determined that incremental addition of water in fractional percentages increases the consistency of a grease. While this might appear superficially to be a beneficial effect, nonetheless the remarks made above relative to optimum consistency of grease for specific purposes is of paramount importance. Maximum resistance to hardening due to water uptake may be achieved by not only incorporating the oil-dispersible amido amine in the substantially dry grease as described above but also adding to the grease an amount of water between about 0.05 and 0.2% by weight of water in the final composition. This may be modified still further by the presence of antioxidants such as phenyl alpha-naphthylamine and the like as well as by the presence of anti-corrosion agents such as sodium nitrite, both preferably present in amounts between about 0.25 and 1% by weight of the grease composition.

The oil-dispersible amido amine to be added in an amount between 0.25 and 1% by weight of the grease, the latter containing less than about 5% by weight of water, is normally a mixture of amido amines formed between higher molecular weight fatty acids and a complex mixture of polyethylene polyamines. For the purpose of ease of handling, it is preferred that the mixture contain between 20 and 80% by weight of ethylene diamine or diethylene triamine as a diluent, the remaining polyethylene polyamines being those starting with tetraethylene pentamine and related higher polymers having increasing complexity in structure and molecular weight.

The mixture of high molecular weight polyethylene polyamines is normally obtained as a bottoms product in the process for the preparation of ethylene diamine. Consequently, it normally constitutes a highly complex mixture and even may include small amounts (less than about 3% by weight) of oxygenated materials. A typical mixture of polyethylene polyamines diluted with about 25% by weight of diethylene triamine has the following analysis:

Percent by weight carbon _____ 51.5
Percent by weight nitrogen _____ 34.3
Percent by weight hydrogen _____ 11.6
Percent by weight oxygen _____ 2.5

Total basicity, equivalents per 100 grams=1.98, equivalent to 27.7% nitrogen.
Active nitrogen=81%.
Amine types, equivalents per 100 grams: Primary, tertiary, 1.20, 0.30.
Specific gravity at 25° C.: 0.995–1.020.
Viscosity: 75–250 centipoises.
Equivalent weight: 42.5–47.5.

The fatty acids to be utilized for the formation of amido amines with the polyethylene polyamines should have from about 10 to about 22 carbon atoms per molecule and preferably from 17 to 19 carbon atoms, if at least 50% by weight of the acids are unsaturated and from 10 to 16 carbon atoms per molecule if the acids are substantially saturated. The product thereby formed may be either liquid or solid depending in part upon the degree of saturation of the acids employed. In order to form a product which is liquid at the temperatures involved, it is desirable to utilize a mixture of fatty acids wherein at least 50% by weight of the mixture comprises acids having at least one double bond per molecule. Still more preferably, at least 85% by weight of the fatty acids contain double bonds and may have either one or two double bonds per molecule. Stearic acid may form a member of the mixture but should be present in no more than 50% by weight thereof. Linoleic and oleic acids as well as linolenic acids are preferred. The acids naturally occurring in tall oil are optimum insofar as their properties are concerned for use in the formation of the amido amines used in the present invention. Unsaturated fatty acids which are useful for this purpose are available from source materials given in Table 1.

TABLE 1

*Unsaturated, low cost fatty acid mixtures*

| Trade Name | Iodine No. | Sap. No. mg. KOH |
|---|---|---|
| Standard Bone Tall | 59 | 210 |
| Yellow Grease | 52 | 217 |
| Oleic Acid | 82 | |
| Fatty Acid Residue | 83 | 157 |
| Tall Oil Fatty Acid | 130 | 196 |
| Tall Oil Fatty Acid | 138 | 192 |
| Crude Tall Oil | 174 | 173 |
| Distilled Tall Oil | 164 | 193 |

A grease having substantially greater resistance to oxidation is obtained by utilizing saturated acids in forming the amidoamine. A product which is fluid at the temperatures utilized in the grease processing steps involved is the amido amine prepared from saturated fatty acids having 10–16 carbon atoms per molecule and preferably from mixtures of fatty acids predominantly in saturated fatty acids having 10–14 carbon atoms per molecule. Species meeting these requirements include capric, undecylic, lauric, tridecylic, myristic, pentadecylic and palmitic acids. A suitable natural source of saturated fatty acids giving a liquid amido amine is coconut oil.

It is preferred that the ratio of fatty acids to polyamines be restricted to 0.3–0.6 equivalents of fatty acids for each equivalent of polyethylene polyamine. Optimum properties are obtained when the ratio is restricted to 0.4–0.5 of equivalent acid per equivalent of amine.

The fatty acids and polyamines may be reacted at any temperature sufficient to produce amide formation, although at the relatively higher temperatures conversion of at least part of the amides to imidazoline or glyoxalidine structures may occur. However, for the purpose of the present discussion these will all be referred to as amido amines. Reaction temperatures can vary between about 125° C. to about 250° C., the preferred range being between about 190 and 225° C. Within this temperature range, additives having optimum properties with respect to grease are formed, especially when the reaction times are between about 0.5 and 16 hours and preferably between about 1 and 4 hours. The products so obtained have on the average about 0.5–1.25 imidazoline groups per molecule, although amido groups are present as well.

It will be understood that this particular type of additive may be utilized in the subject grease compositions not only as the additive to prevent hardening of the grease due to water absorption but also for the purpose of providing the clay with hydrophobing surfaces. For the latter purpose, however, it is added to the clay while the latter is highly swollen with water, after which the water is removed at least until the grease composition contains no more than about 5% by weight of water at which point the secondary addition of the amido amine is made to prevent hardening by the presence of moisture.

In place of or in partial addition to the amido amines formed as described above, the clays may bear hydrophobing portions of other amido amines such as those described in the Peterson patent U.S. 2,623,852. The hydrophobic amido amines described there are generically referred to as amido amines of polyamino oxy compounds containing at least 3 amino nitrogen atoms and oxy groups per molecule together. For the most part, the preferred starting materials for preparing such additives are epichlorohydrin and ammonia which, when reacted together as described in the Peterson patent, form a complex series of hydroxy polypropylene polyamines. These are then in turn reacted with fatty acids as described above to form the amido amines desirable for use as hydrophobing agents for the clays utilized in the subject grease formation. It should be stressed that this type of amido amine, while satisfactory for improving the hydrophobic characteristics of the clay, provides the protection against hardening of the final grease compositions due to water absorption as is provided by the use of the amido amines formed by reaction of fatty acids with polyethylene polyamines as described hereinbefore.

The preferred process for preparing grease compositions according to the present invention involves the following steps: Clay is selected preferably having a relatively high base exchange capacity and ability to swell to a relatively high degree in water. Bentonitic clays are preferred for this purpose and hectorite clays have been found to have optimum properties. The gangue is removed from the clay after its dispersal in water to form a hydrosol or hydrogel having approximately 1–4% of clay on a degangued basis. The gangue can be removed, for example, by passage of the clay-water suspension through a separator.

The degangued water slurry of clay is then mixed with a stream of the hydrophobing agent, namely, one of the amido amines described hereinbefore, and at least a portion of the mineral oil or other lubricating oil base. These are preferably commingled at a temperature between about 50° C. and about 85° C. which results in the formation of a curd of clay, oil, amido amine and water, and a separate water phase, the water constituting a major portion of that in which the clay was originally suspended.

Prior to commingling of the clay hydrogel with the hydrophobing agent and oil, it is preferred practice to modify the clay hydrogel with a minor proportion of phosphoric acid preferably between about 1 and 10% by weight based on the dry clay. Subsequent to the formation of the curd comprising hydrophobed clay, oil and a minor proportion of water, the separated water may be removed by passage of the wet curd over a rotating screen or the like where the separate water phase falls through while the curd proceeds to the end of the screen which is preferably positioned in a slanting manner. The wet curd is passed to a hydrating unit, such as a stirred kettle, where the balance of the oil is added and the remaining water is removed by distillation.

The second stage of addition of amido amine is not made until the water content of the grease ingredients is less than about 5% by weight thereof and preferably less than about 0.5% by weight. At this point the second addition of amido amines is made in an amount between about 0.25 and 1% by weight of the grease ingredients. This can be done simply by stirring the amido amine into the grease either before or after passage through a high pressure pump or other homogenizing means providing a high degree of shear for the purpose of creating a satisfactory grease structure.

The proportion of hydrophobic amido amine added to the clay in the initial stage (i.e. to the clay hydrosol) is preferably between about 40% and 100% by weight based on the dry clay weight and optimum results are obtained when this proportion is in the order of 60-80% by weight based on the dry clay. The proportion of clay necessary to gel the lubricating oil will depend in part upon the nature of the clay, the proportion of amido amine present and the kind of lubricating oil employed. Normally, however, it will be between about 2% and about 20% by weight based on the total grease composition.

The optimum degree of stabilization of the grease composition is obtained by incorporation of a minor proportion of water preferably in the order of 0.05-0.25% subsequent to dehydration of the grease ingredients. This has been found to be preferred since in a normal atmosphere, containing approximately 30% humidity, the subject grease compositions will absorb water up to about 0.15% and in so doing will materially change their consistency, i.e. become harder. Hence, it is preferred practice to impart this amount of water to the grease and adjust the penetration to the desired level by means of the necessary clay content so that the grease will maintain this level upon subsequent exposure to a humid atmosphere, especially when the second stage (dry) addition of the amido amine has been made. Still further improvements in the resistance to hardening upon exposure to a humid atmosphere is obtained by the presence of corrosion inhibitors, such as sodium nitrite and the like or oxidation inhibitors, such as phenyl alpha-naphthylamine, in the amounts referred to hereinbefore, namely, 0.25-1% by weight of the final grease compositions. The examples which follow illustrate the practice of the present invention.

EXAMPLE I

A grease composition was prepared by the use of a hectorite clay hydrophobed with 60% by weight thereof of an amido amine contained in a medium viscosity lubricating oil. The preparation was by means of dispersing the clay in water to form a dilute suspension and combining the amido amine and oil with the warmed suspension. A separate water layer formed which was withdrawn. The remaining curd was then dehydrated in a kettle with stirring at a temperature sufficient to remove the water by distillation to form a grease composition containing about 0.1% by weight of water. The sample was then divided in three parts, one of which was placed in a can and immediately sealed. This is referred to as Part A. To the remaining two parts, B and C, 0.75% by weight of the same amido amine (based on the grease) was added. Part (C) of the blend was placed in a sealed can and put in a 200° F. oven for two hours. The remaining part (B) was allowed to cool in the kettle. Incremental proportions of water were added as indicated by the data contained in FIG. I. It will be noted that the addition of water to portion A (containing no secondary addition of amido amine) caused excessive hardening of the grease. The addition of water to part B showed that the presence of the amido amine added after the grease had been dehydrated prevented most of the hardening due to subsequent water addition. Finally, the relative insensitivity to water addition shown by part C indicates that the combination of a heat treatment with the secondary addition of amido amine virtually stabilized the grease against change in consistency due to the presence of water.

EXAMPLE II

In order to demonstrate that the stabilization of consistency upon the addition of water is not merely due to an increased amount of the amido amine used in the original hydrophobing of the clay to form the grease structure, samples were prepared in which all of the amido amine was added to the grease ingredients while the initial large proportion of water was present and prior to dehydration. FIG. II illustrates the results obtained by this method. The solid line indicates approximately the same data shown as the line for the curve for Part A in FIG. I, namely, that excessive hardening occurred upon the addition of water. However, all of the samples tested in this series showed the same general degree of hardening upon water addition regardless of the fact that the initial amido amine content was increased as indicated. Comparison of the data contained in FIG. II with that present in FIG. I will show beyond any question that the amido amine must be added in two successive steps, the latter step being the incorporation of the minor amounts (0.25-1%) after water has been eliminated from the grease.

EXAMPLE III

Table 1 contains data showing the effect of water content at the time of the secondary addition of surfactant to grease-forming ingredients. The variation in water content depends upon the stage at which the secondary addition is made. If all of the water in which the clay is originally dispersed is present at the time of the secondary addition of the surfactant, it will be noted according to the table and according to FIG. III that hardening of the grease is excessive upon subsequent dehydration and reintroduction of fractional percentages of water. If the water which separates upon primary addition of surfactant is removed and the secondary addition of surfactant then is made, it will be noted according to the table and FIG. III that the eventually formed grease is not as sensitive to moisture absorption as was true in the first case. However, there is still an objectionably large response to water absorption as shown by the curves in FIG. III. If the grease was substantially completely dried subsequent to initial formation of the major amount of waterproofing material, combination with lubricating oil and heating to remove substantially all of the water, it will be seen according to the table and FIG. III that there is substantially no increase in penetration upon subsequent addition of fractional percentages of water. This illustrates clearly the critical timing necessary for the secondary addition of waterproofing agent.

TABLE 1

*Moisture hardening in clay greases*

[As related to the water content at time extra Talamid is added]

| Grease condition when Talamid added | Water Content, g./100 g. | ASTM Worked Penetration | | Penetration change |
|---|---|---|---|---|
| | | at 0.1% added water | at 1.0% added water | |
| Right after curd forms | 180 | 312 | 198 | 114 |
| Drained curd | 27 | 342 | 257 | 85 |
| As drying curd reaches 240° F. | 0.108 | 320 | 275 | 45 |
| 5 min. later | 0.093 | 321 | 273 | 44 |
| 10 min. later | 0.072 | 313 | 271 | 42 |
| 15 min. later | 0.063 | 324 | 290 | 34 |
| 20 min. later | 0.076 | 347 | 312 | 35 |
| After 10 min. at 240–280° F. NaNO₂ solvent added: | | | | |
| 0.75% Amino Amide added ½ min. later | 0.11 | 365 | 325 | 40 |
| 0.75% Amino Amide added 15 min. later | 0.06 | 336 | 316 | 20 |

EXAMPLE IV

The data contained in Table 2 which follows and the curves given in FIG. IV illustrates two points, namely, the effect of the amount of initial addition of hydrophobing agent to the grease and the effect upon water sensitivity (with respect to penetration) of a secondary addition of the waterproofing agent. It will be seen that for each of the three levels of initial waterproofing concentration there is a substantial benefit gained by the subsequent addition of the waterproofant to substantially dry grease ingredients.

TABLE 2

| Amino Amide Added to Clay Slurry, w. Percent of Clay | Total Clay in Grease, w. Percent | Change in Penetration with Water Content Change from 0.1 to 1.0% | |
|---|---|---|---|
| | | Initial | 0.75% Amino Amide Added to Dry Grease ᵃ |
| 60 | 5.0 | 59 | 23 |
| 70 | 5.2 | 64 | 20 |
| 80 | 5.6 | 42 | 14 |

ᵃ All samples were heat treated two hours at 200° F. after adding the extra amino amide.

EXAMPLE V

Greases were prepared in order to illustrate the effect upon consistency of antioxidants, such as phenyl alpha-naphthylamine and anticorrosion agents, such as sodium nitrite, both in the presence and absence of a secondary addition of the waterproofing agent. The data obtained are shown in FIG. V. Examination of this figure indicates that either phenyl alpha-naphthylamine or sodium nitrite have a minor effect upon consistency of a grease which has not been treated in two stages with the waterproofing agent, but the presence of these materials does not improve or substantially alter their hardening upon subsequent water addition in fractional percentages. For the purpose of comparison, the same greases were prepared with the additional presence of 0.75% by weight of the waterproofing agent being added after the grease-forming ingredients were substantially anhydrous. It will be seen according to the figure that the greases so prepared were essentially insensitive to subsequent water addition. It will also be seen that the presence of phenyl alpha-naphthylamine and sodium nitrite either singly or in combination had a minor effect upon the consistency of the grease and had apparently no effect upon the response of the grease to subsequent water addition.

The amido amine utilized in the above examples was prepared as follows: The bottoms product from ethylene diamine, diluted with 25% diethylene triamine, and described earlier was heated for about 2 hours at 210° C. with sufficient tall oil acids to form amides with 42% of the amino groups. This product is referred to throughout as an amido amine.

EXAMPLE VI

Two greases were prepared utilizing an amido amine from tall oil (Grease A) and an amido amine from coconut oil acids (Grease B), respectively. The polyamines employed are the bottoms product from ethylene diamine manufacture diluted with 25% diethylene triamine and described in detail hereinbefore. The clay as a 2% w. slurry is heated to 160° F., diluted phosphoric acid is added, followed by the amido amine and oil. The resulting "pearls" are separated from the water layer and heated with gentle stirring to 260° F. for 15 to 20 minutes to remove the water. The oxidation inhibitor and amido amine (to prevent moisture hardening) are then stirred in and the grease is cooled and milled.

| Formulas, Percent w. | Grease A | Grease B |
|---|---|---|
| Hectorite clay | 6.59 | 5.05 |
| Phosphoric Acid, 85% | 0.52 | 0.35 |
| Tall oil amido amine | 3.94 | |
| Coconut oil amido amine | | 2.85 |
| HVI 500 Neutral | 87.85 | 89.75 |
| Sodium Nitrite | 0.60 | |
| Sodium Sebacate | | 1.00 |
| Phenyl alpha napthylamine | 0.50 | |
| Phenyl beta napthylamine | | 1.00 |
| | 100.0 | 100.0 |
| Extra Talamid | 0.75 | |
| Extra Cocoamid | | 0.75 |

| Test Results | ILC Darina Grease 2 | Premium Microgel Grease |
|---|---|---|
| Bomb Oxidation Test: Pressure decrease after— | | |
| 100 hrs., p.s.i. | 12 | 7 |
| 300 hrs., p.s.i. | 22 | 9 |
| 500 hrs., p.s.i. | 25 | 11 |
| Wheel Bearing Test, 275° F., 660 r.p.m.: ½ scale penetration— | | |
| before test | 95 | 77 |
| after test | 121 | 98 |
| Leakage, g | 2.0 | 0.4 |
| Rating | good | excellent |
| 4 Bearing Text, 300° F., 3600 r.p.m.: (80 lb. axial load, 200 lb. radial load): | | |
| Time for failure, hr avg | 800 | 1,440 |

The amido amines were prepared with sufficient fatty acid to form amides with 42% of the diluted polyamine bottoms product previously described, the reaction mixture being heated for 2 hours at 210° C.

The resistance to hardening and improvement in static and dynamic grease properties is enhanced by the presence of oxidation inhibitors and/or corrosion inhibitors. Outstanding results are obtained by the use of alkali metal nitrites or ammonium nitrites as corrosion inhibitors such as sodium nitrite, dicyclohexylammonium nitrite, diisopropylammonium nitrite and mixtures of the same. While the nitrites improve corrosion characteristics of the grease, they tend to degrade its oxidation resistance. Aliphatic dicarboxylic acids are more satisfactory since they have no effect on oxidation susceptibility and at the same time impart excellent corrosion inhibiting properties. Effective species of such acids include sebacic, adipic, azelaic, pimelic and suberic acids.

The diaryl amines are preferably those in which phenyl or napthyl radicals are directed attached to the nitrogen radical. The aryl rings may be alkylated, preferably with alkyl groups having from 1 to 10 carbon atoms each. Mixed diaryl amines may be employed or the amines may be symmetrical with regard to their configuration. The following are typical to the species to be utilized in accordance with the present invention, the preferred species being diphenyl amine.

Diarylamines:

Diphenylamine
Di-(α-napthyl)amine
Di-(β-napthyl)amine
Phenyl-α-napthylamine
Phenyl-β-napthylamine
Bis(ethylphenyl)amine
Bis(tert-butylphenyl)amine
(α-Napthyl)(β-napthyl)amine
Bis(dimethylphenyl)amine
Bis(diethylphenyl)amine
Phenyl-beta(butylnapthyl)amine For some undetermined reason, the use of diaryl amines wherein at least one of the aryl radicals is attached directly to the nitrogen atom (as in phenyl-beta-napthylamine), are more satisfactory than their alpha isomers in that they do not discolor the grease upon exposure to oxidation. Greases containing the alpha isomers often turn various shades of purple when exposed to oxidation.

This application is a continuation-in-part of application Serial No. 769,933, filed October 27, 1958, now abandoned.

I claim as my invention:

1. In the process for the preparation of a clay grease composition wherein a grease-forming amount of clay and a water-proofing amount of a hydrophobic amino amide are dispersed in a lubricating oil and subjected to homogenizing, whereby a grease structure is formed, the improvement which comprises adding to the preformed grease in the absence of more than about 5% by weight of water, 0.25–1% by weight of oil-dispersible amido amines formed between 0.3–0.6 equivalents of fatty acids having 14–22 carbon atoms per molecule and a mixture of 1 equivalent of polyethylene polyamines, 20–80% by weight of the mixture comprising polyamines having 2–3 nitrogen atoms per molecule, the remaining fraction being polyethylene polyamines having an average molecular weight within the range 200–500.

2. The process according to claim 1 wherein the hydrophobic amido amines surface coating on the clay is identical with the oil-dispersible amido amines.

3. The process according to claim 1 wherein the hydrophobic amido amines are polyamino oxy compounds containing an average of at least three amino nitrogen atoms and oxy groups together per molecule.

4. The process according to claim 1 wherein the hydrophobic amido amine is present in an amount between about 40% and about 100% by weight of the clay.

5. The process according to claim 1 wherein the oil-dispersible amido amines are added in the presence of no more than about 0.5% by weight of water and in an amount between about 0.5% and about 0.8 by weight based on the grease composition.

6. A process according to claim 1 wherein the grease formed as recited is held at a temperature between about 125° F. and about 210° F. for a period between about 0.5 and about 8 hours, after the addition of the oil-dispersible amido amines.

7. In the process for the preparation of a clay grease composition wherein a grease-forming amount of clay and a water-proofing amount of a hydrophobic amino amide are dispersed in a lubricating oil and subjected to homogenizing, whereby a grease structure is formed, the improvement which comprises added 0.5–0.8% by weight of the same amido amines to the grease in the presence of 0.05–0.2% water, 0.25–1% by weight of phenyl alphanaphthylamine and 0.25–1% by weight of sodium nitrite.

8. The process according to claim 7 wherein the grease is held at a temperature of 150–200° F. for 1–4 hours subsequent to the second addition of amido amines.

9. A process according to claim 7 wherein the grease composition so formed is subjected to homogenizing subsequent to substantially complete dehydration.

10. In the process for the preparation of a clay grease composition, wherein hectorite clay is dispersed in water, mixed with a mineral lubricating oil and a hydrophobic amino amide in an amount sufficient to form a hydrophobic clay, whereby water separates from the wet grease-forming ingredients and is discarded, and the wet ingredients are substantially dehydrated and subjected to homogenizing, whereby a grease structure is formed, the improvement comprising adding to the substantially dehydrated grease ingredients 0.25–1% by weight of oil-dispersible amido amines formed bewteen 0.3–0.6 equivalents of fatty acids having 14–22 carbon atoms per molecule and a mixture of 1 equivalent of polyethylene polyamines, 20–80% by weight of the mixture comprising polyamines having 2–3 nitrogen atoms per molecule, the remaining fraction being polyethylene polyamines having an average molecular weight within the range 200–500.

11. In the process for the preparation of a clay grease composition, wherein hectorite clay is dispersed in water, mixed with a mineral lubricating oil and a hydrophobic amino amide in an amount sufficient to form a hydrophobic clay, whereby water separates from the wet grease-forming ingredients and is discarded, and the wet ingredients are substantially dehydrated and subjected to homogenizing, whereby a grease structure is formed, the improvement comprising adding to the substantially dehydrated grease ingredients 0.25–1% by weight of oil-dispersible amido amines formed between 0.3–0.6 equivalents of fatty acids having 10–22 carbon atoms per molecule and a mixture of 1 equivalent of polyethylene polyamines, 20–80% by weight of the mixture comprising polyamines having 2–3 nitrogen atoms per molecule, the remaining fraction being polyethylene polyamines having an average molecular weight within the range 200–500.

12. A process according to claim 11 wherein the fatty acids are coconut oil fatty acids.

13. In the process for the preparation of a clay grease composition wherein a grease-forming amount of clay and a water-proofing amount of a hydrophobic amino amide are dispersed in a lubricating oil and subjected to homogenizing, whereby a grease structure is formed, the improvement which comprises adding to the preformed grease in the absence of more than about 5% by weight of water, 0.25–1% by weight of oil-dispersible amido amines formed between 0.3–0.6 equivalents of fatty acids having 10–22 carbon atoms per molecule and a mixture of 1 equivalent of polyethylene polyamines, 20–80% by weight of the mixture comprising polyamines having 2–3 nitrogen atoms per molecule, the remaining fraction being polyethylene polyamines having an average molecular weight within the range 200–500.

14. A process according to claim 13 wherein the acids are substantially saturated acids having 10–14 carbon atoms per molecule.

References Cited in the file of this patent

UNITED STATES PATENTS

| | | |
|---|---|---|
| 2,623,853 | Stross | Dec. 30, 1952 |
| 2,668,145 | Ronay | Feb. 2, 1954 |
| 2,681,314 | Skinner et al. | June 15, 1954 |
| 2,748,081 | Peterson et al. | May 29, 1956 |
| 2,831,809 | Peterson | Apr. 22, 1958 |
| 2,875,152 | Van Scoy | Feb. 24, 1959 |